United States Patent [19]

Settlemyer

[11] Patent Number: 4,783,432

[45] Date of Patent: Nov. 8, 1988

[54] DRYER REGENERATION THROUGH HEAT OF COMPRESSION AND PRESSURE SWING DESORPTION

[75] Inventor: Bernard W. Settlemyer, Ocala, Fla.

[73] Assignee: Pall Corporation, Glen Cove, N.Y.

[21] Appl. No.: 43,631

[22] Filed: Apr. 28, 1987

[51] Int. Cl.⁴ .................. B01J 20/34; B01D 53/04
[52] U.S. Cl. .................................. 502/34; 55/25; 55/33; 55/58; 55/62; 502/38
[58] Field of Search ............... 502/34, 38, 56; 55/20, 55/21, 23, 25, 33, 180, 62, 58

[56] References Cited

U.S. PATENT DOCUMENTS

| | | |
|---|---|---|
| 3,192,686 | 7/1965 | Berkey et al. ............... 55/62 |
| 3,205,638 | 9/1965 | Hagle ............................ 55/33 |
| 3,235,610 | 2/1966 | Wymore ....................... 55/33 |
| 3,346,484 | 10/1967 | Lewis ............................ 55/58 |
| 3,395,511 | 9/1968 | Ackerman ..................... 55/33 |
| 3,568,406 | 3/1971 | Dynes ............................ 55/33 |
| 3,594,983 | 7/1971 | Yearout ......................... 55/33 |
| 3,738,084 | 6/1973 | Simonet et al. ............... 55/62 |
| 3,800,507 | 4/1974 | Howell et al. ................. 55/33 |
| 4,070,164 | 1/1978 | Miwa et al. .................... 55/33 |
| 4,561,865 | 12/1985 | McCombs et al. ............ 55/25 |

OTHER PUBLICATIONS

"Methods of Drying Compressed Air" (form 320) 4 pages, Deltech Eng. Inc.–New Castle, Del.–196F.

Primary Examiner—Paul E. Konopka
Attorney, Agent, or Firm—Leydig, Voit & Mayer

[57] ABSTRACT

An improved method and apparatus for regenerating desiccant in an adsorption dryer is disclosed. The method utilizes a two-phase regeneration, the first phase using the heat from the compressed gas supply to desorb a portion of the moisture from a regenerating desiccant chamber, with the second phase utilizing low pressure, dry product gas. The heat of compression/pressure swing combination offers reduced regeneration energy requirements with improved dewpoint performance.

5 Claims, 1 Drawing Sheet

DRYER REGENERATION THROUGH HEAT OF COMPRESSION AND PRESSURE SWING DESORPTION

BACKGROUND OF THE INVENTION

The present invention relates generally to adsorption dryers using a desiccant to dehydrate gases. Specifically this invention relates to a desiccant gas dryer of the kind having a pair of sorbent or desiccant beds, wherein one bed adsorbs water vapor as the other bed is regenerated. More particularly, the invention relates to the regeneration of the desiccant using a combination of the heat of compression and a dry gas purge sweep.

It is frequently desirable and often necessary to remove at least the greater portion of water and some times the last traces of moisture from gases. For example, in natural gas pipeline transmission systems, hydrate formation can be eliminated by removing a sufficient amount of the water vapor so that the dew point of the gas is at least as low as the minimum temperature to which the gas will be exposed at the maximum pressure utilized in the system. Also, many processes wherein gases such as air or low molecular weight hydrocarbons are used as reagents require that said gases be essentially anhydrous. Even in situations where the gas is not utilized as a reagent, such as in pneumatic control systems where so-called "instrument air" is employed as the power fluid, it is required that the air be essentially anhydrous in order to avoid condensation and ice formation during winter conditions.

Ambient air even in the driest areas contains moisture. Relative humidity is the term used to indicate the amount of water vapor present in a volume of air at a given temperature compared to the amount of water vapor that air is capable of holding at that temperature. For example, if the vapor content is 70% of the moisture holding capacity of the air at a certain temperature, then the relative humidity would be 70%.

When the temperature of saturated air is lowered, some of the vapor condenses or changes to liquid. As a rule of thumb, the water holding capacity of a gas doubles with every 20° F. rise in temperature. Thus the higher the temperature, the more vapor that can be held by a given volume of air. Dewpoint is the air temperature, at any given pressure, at which water vapor begins to condense into a liquid. The lower the dewpoint, the less water there is in the air. The water holding capacity of a gas is also dependent upon volume. If the actual volume of a saturated gas is increased by reducing the pressure, then the water holding capacity of that gas increases.

As previously mentioned, the presence of water in a pneumatic system can be very detrimental, the water becomes the agent for a contamination chain. Rust and scale rapidly degrades the efficiency of the system by clogging the orifices and jets of pneumatic equipment; rust collects in bends and pockets creating excessive pressure drops; pipe connectors are weakened and leaks are encouraged; rust can break loose, pass down stream and render pneumatic instruments inoperative.

Desiccant dryers are commonly employed to dry compressed air used for pneumatic controls in manufacturing plants. These dryers typically have a pair of desiccant chambers each containing, for example, silica gel, alumina or zeolitic molecular sieves adsorbents. In such systems, the beds alternately dry the process stream and then are regenerated.

Once a desiccant becomes moisture laden, additional moisture cannot be removed from the gas during the adsorption cycle until the desiccant has been regenerated. In general, the more thorough the regeneration, the better the quality of the effluent air, in terms of having a low dewpoint, and the more moisture which can be adsorbed before the next regeneration. It is generally understood that the quality of regeneration is dependent upon the temperature and dryness of the regenerating media. See Arnold L. Weiner, "Drying of Liquids and Gases," page 6, Chemical Engineers, Sept. 16, 1974. It is known that adsorbents may be regenerated by a variety of techniques, including heating the adsorbents or desiccants, passing a dry purge gas through the desiccant or by passing heated gas through the bed. Such techniques may be referred to as heat-regenerated, pressure swing and heat-of-compression systems, respectively, with the latter designation deriving from a known practice of using the heat generated by compressing the gas to be dried.

One basis for comparison of the various regeneration techniques is the amount of energy required for regeneration. Very generally, pressure swing regeneration typically employs the most energy (through use of compressed, product air as the regeneration medium), but offers very good dewpoint performance.

Heat regenerated dryers typically employ somewhat less regeneration energy, with some sacrifice in dewpoint performance. Heat of compression dryers are susceptible to wide swings in regeneration costs depending on the condition (moisture content and temperature) of the compressor inlet air. "The Truth About 'Waste Heat' Air Dryers," page 105, *Machine Design*, Mar. 27, 1987, incorporated herein by reference. In dry winter months, heat of compression dryers can give low dewpoints more economically than either heat-regenerated or pressure swing systems. In humid summer months, however, conventional heat of compression dryers may require more energy than either heat regenerated or pressure swing dryers for comparable dewpoint performance. This is explained in more detail below.

A prior art practice of heat of compression desiccant dryers as disclosed, for example, in U.S. Pat. No. 3,205,638 is to utilize the compressor discharge gas heat to fully achieve regeneration. Specifically, in prior art heat of compression dryers, the compressor discharge is typically passed through a regenerating desiccant chamber where it heats and desorbs moisture from the desiccant requiring regeneration. The discharge gas from the regenerating chamber passes through a cooler where the gas is cooled and the water vapor is condensed out. Following the cooler is a separator which separates and collects the condensed water which is discharged or vented from the separator valve. The gas then passes through the active or drying chamber where water vapor is further removed to provide for a dry gas delivery at the dryer outlet. At conditions of high humidity, as in summer, however, the desiccant cannot be satisfactorily regenerated to a level which will produce minus 40° F. dewpoints when drying. This has lead to the use of a booster heater to raise the temperature of the compressor discharge to a level that will result in the regeneration characteristic of providing the minus 40° F. dewpoint desired. The use of such a booster heater, of course, increases the regeneration energy. A comparison of regeneration energy requirement for various types of dryers is given in Table I. The table shows the regeneration energy requirements for a 2000 scfm. 100 psig air dryer dryer employing silica gel desiccant and utilizing a 400 h.p. 2-stage oil-free compressor, operating with an ambient temperature of 100° F. and 50% relative humidity with a design effluent dewpoint of −40° F. Along with the heat of compression dryers are listed the energy requirements for an electrically heated air dryer and a heaterless regenerated dryer.

TABLE I

| Dryer Type | Heater Size | Energy Requirement | Remarks |
|---|---|---|---|
| HOC 1 Hour Cycle | 93KW | 93KW | 450° temperature required for regeneration air quality, outlet temperature and dewpoint spikes at chamber switching |
| HOC 8 Hour Cycle | 23KW | 23KW | 450° temperature required for regeneration air quality, outlet temperature and dewpoint spikes at chamber switching |
| Electric 8 Hour Cycle Side-Stream Regeneration | 38KW | 38KW | Heater and side stream flowrate must be matched to produce regeneration heat quantity and temperature humidity quality, temperature and dewpoint spikes at chamber switching |
| Heaterless (PSA) | NONE | 45KW Dry Purge Air Compressor Energy | 300 SCFM purge air consumption requires 45KW compressor energy. Dry air delivery is 1700 SCFM. No temperature spikes, no dewpoint spikes. |

As explained above, the requirements for heat-of-compression regeneration are subject to wide variation depending upon the temperature and humidity of the ambient air feed to the compressor. By way of example, with the ambient air feed at 60° F. and 50% relative humidity (as opposed to the 100° F. and 50% relative humidity conditions for Table I), the booster heater requirement for the one hour heat of compression example above would be 31KW. This requirement results from a 300° F. regeneration temperature necessary to achieve a −40° F. effluent dewpoint.

SUMMARY OF THE INVENTION

It is the object of the invention to provide a method and an apparatus for regenerating moisture laden desiccant which yields thorough regeneration yet also has a low regeneration energy requirement.

It is a more specific object of the present invention to provide a system which economically achieves a regeneration of the desiccant sufficient to produce a minus 40° F. product discharge dewpoint.

It is also an object of the invention to increase the useful life of the desiccant by decreasing degradation during regeneration.

Other objects and advantages include reduction of capital and maintenance costs, longer life, and reduced corrosion due to lower operating temperatures. To accomplish these objects the present invention contemplates using a pressure swing dry purge after partial regeneration through a heat of compression regeneration cycle. The result is a more energy efficient regeneration which economically allows for a minus 40° F. dewpoint. Most of the moisture is removed by the heat of compression dryer, with only a small volume of dry product gas required for the final phase of the regeneration. Significantly, this regeneration system is considerably more energy efficient than known regeneration systems. Specifically, it has been found that using a low pressure dry gas purge at a rate of about 1% to 5% of total dry gas product (depending on conditions of operation, i.e., winter or summer) will produce the desirable minus 40° F. dewpoints.

Moreover, the low pressure product gas purge cools the desiccant during the later phase of the regeneration. This cooling eliminates dewpoint spikes which occur commonly in heat of compression dryers as a result of the high desiccant temperature at the onset of the adsorption cycle. In typical heat of compression dryers, at the time the newly regenerated chamber is first switched over for the adsorption phase, the desiccant is still relatively hot from the regeneration using the heat of compression gas. The hot desiccant is not able to hold as much moisture as a cooler desiccant, so there is a "spike" of moist air that passes out of the adsorption chamber until the desiccant is cooled. The regeneration system of the present invention avoids these dewpoint spikes by utilizing a dry cool purge at the end of the regeneration cycle, which also liberates more heat by vaporization, cooling the desiccant prior to the start up of the new adsorption cycle.

Other objects and advantages of the invention will become apparent upon reading the attached detailed description and upon reference to the drawings in which:

While the invention has been described in connection with a preferred embodiment, it will be understood that the intention is not to be limited to the particular form of the invention which has been shown, but the invention is, on the contrary, to cover the various alternative and equivalent constructions included within the spirit and scope of the appended claims. Particularly it is understood that although the specification specifically discloses use in separating water from air, the system may be used for separating other liquids and gases.

DETAILED DESCRIPTION OF THE PREFERRED EMBODIMENTS

Figure 1:
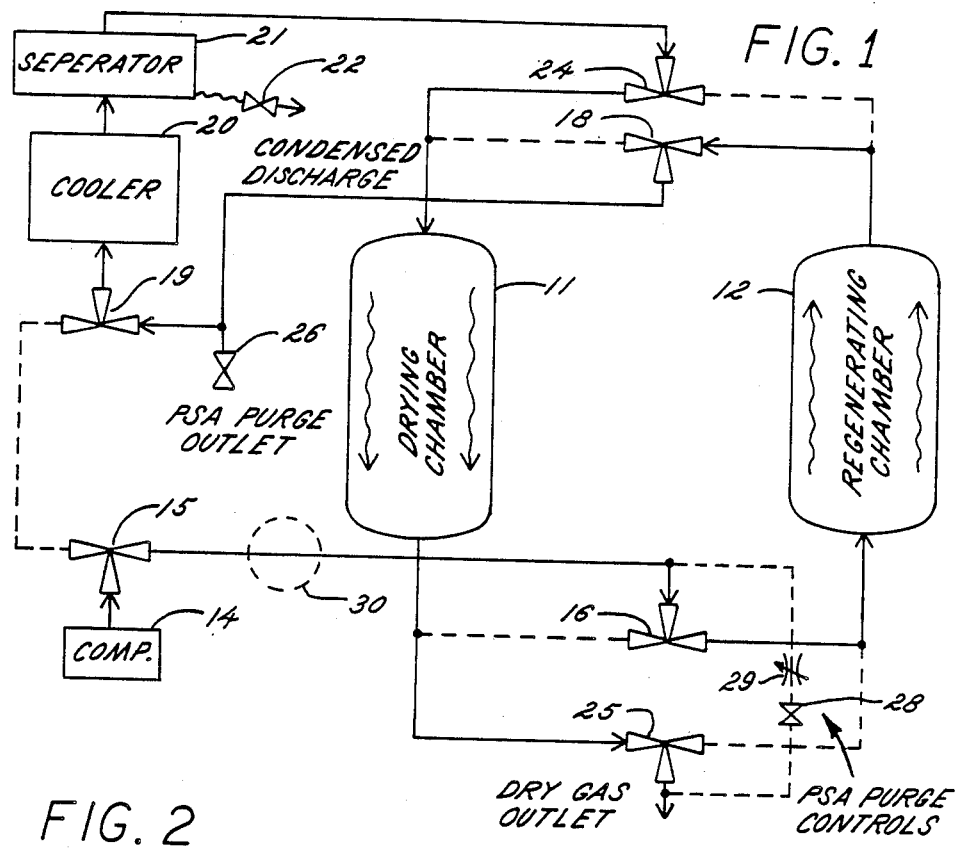
FIG. 1 is a schematic illustration of a dryer regeneration through heat of compression and pressure swing adsorption system of the present invention.

Referring to FIG. 1, a dryer according to the invention is shown having two desiccant-filled drying chambers 11 and 12 and a compressor 14 for supplying pressurized feed gas. Any of several well known desiccants may be employed, with silica gel being one example. As is well known, the gas from the compressor discharge is hot as a result of the compression. The basic operation of the system shown is described below beginning at a point in time at which bed 11 is in the drying phase and bed 12 is in the regeneration phase. To assist in following the discussion of the gas flow through the various elements shown in FIG. 1, the initial flow path is shown in solid lines, while alternative flow paths at other phases of the regeneration are shown in dotted lines. The hot gas from the compressor 14 is directed through three-way valves 15 and 16 and up through the regenerating desiccant chamber 12 where it heats and desorbs moisture from the desiccant requiring regeneration. The discharge gas from the regenerating chamber passes through three-way valves 18 and 19, and through a cooler 20 where the gas is cooled and water is condensed out. Following the cooler 20 is a separator 21 which separates and collects the condensed water, which is discharged or vented from the separator by a discharge valve 22. The cooled gas then passes through three-way valve 24 and down through the active or drying desiccant chamber 11 where water vapor is adsorbed. Dry gas product exits at the three-way valve 25. According to the invention, after the complete heating of the regenerating desiccant chamber 12, the three-way valves 15 and 19 are shifted and the compressed air from the compressor bypasses the regenerating chamber. Drying continues in bed 11.

It should be noted at this point that the heat of compression regeneration aspect of the system shown in FIG. 1 and described above is particularly suitable for shorter cycle (typically one hour NEMA cycle) air dryers. A system more suitable to longer cycle (e.g., an 8-hour NEMA cycle) could also be employed without departing from the spirit of the invention. Such a system could employ a well known side-stream arrangement (not shown). In such a system only a portion of the compressor discharge is employed for regeneration, the remaining portion being fed directly through a cooler and separator.

According to another aspect of the invention, the regeneration is continued by using a pressure swing method. To accomplish this, a vent valve 26 opens, allowing the regenerating chamber 12 to depressurize to atmosphere or another lower pressure environment. Also, a valve 28 opens and product gas tapped from downstream of valve 25 is metered through a variable orifice 29 and into the regenerating chamber 12. In a manner similar to known pressure swing regeneration, the dry product gas desorbs residual water vapor from the regenerating desiccant while resulting in a cooling of the desiccant by the vaporization process. At the end of the pressure swing desorption cycle, vent valve 26 closes and the regeneration chamber 12 is repressurized to line pressure and held on standby for switching to drying service. Purge control valve 28 may then close. After the drying chamber 11 has completed its adsorption cycle, all three way valves (15, 16, 18, 19, 24 and 25) shift. The drying cycle is then repeated with chamber 12 being used for drying while the other chamber 11 is regenerated.

The following examples illustrate the reduced regeneration energy requirements and improved lower dewpoint capability of a dryer using the present invention of heat of compression and pressure swing adsorption regeneration system versus conventional heat of compression regeneration. Specifically the examples 1, 2 and 3 depict runs of conventional heat of compression performance and examples and 4, 5, and 6 are examples of the present invention using the combined heat of compression and pressure swing method and apparatus. The apparatus used in all examples was a silica gel-filled test bed fitted with a preheater and humidifier. The preheater and humidifier were used to simulate the discharge conditions for a two-stage compressor operating at ambient conditions typical of summer time (100° F., 50% R.H.). The apparatus held a constant entering condition of about 300° F., about 149° F. pressure dewpoint (77° F. dewpoint at atmospheric pressure) and about 80 psig pressure. During the drying periods for the testing, the entering compressed air temperature was held at about 100° F. Variations from these nominal conditions are indicated in the descriptions of the specific examples.

EXAMPLE 1

A regeneration using the heat of compression method of the prior art was run for 225 minutes. The inlet temperature was 300° F. and the dewpoint at ambient pressure was 76.5° F. After a two hour idle period, a four hour adsorption run was started using a flow of 70 scfm, a pressure of 80 psig and an inlet temperature of between 110 and 100° F. The dewpoint temperature as recorded each hour during the adsorption cycle was as follows: 7.4° F., 12.9° F., 15.9° F., 19.9° F.

EXAMPLE 2

A regeneration using the heat of compression method of the prior art was run for 210 minutes. The inlet temperature was 298.3° F. and the dewpoint at ambient pressure was 76.5° F. After a 105-minute idle period, a four hour adsorption run was started using a flow of 69 scfm, a pressure of 80 psig and an inlet temperature of 102° F. The dewpoint temperature taken each hour during the adsorption cycle was as follows: 8.1° F., 12.8° F., 17.0° F., 20.4° F.

EXAMPLE 3

A regeneration using the heat of compression method of the prior art was run for 135 minutes. The inlet temperature was 290° F. and the dewpoint at ambient pressure was 77.5° F. After a 90-minute idle period, a four hour adsorption run was made at a flow of 71 scfm, a pressure 80.5 psig and inlet temperature 103° F.–100° F. The dewpoint pressure was taken at 2.42 hours, 3.25 hours, and 4.0 hours, respectively, into the run. The dewpoint temperature taken during the adsorption cycle was as follows: 20° F., 20.3° F., and 16.2° F., respectively.

EXAMPLE 4

A regeneration using the present invention heat of compression and pressure swing method was run. The regeneration began with a 90-minute heat of compression regeneration. The inlet temperature was 304° F. and the dewpoint was 76.5° F. After a five-minute idle period, the pressure swing regeneration was started and run for 48 minutes at a flow rate of 5 scfm and a temperature of between 120° F. and 113° F. The low pressure purge was then terminated and the bed was idle for a period of 102 minutes. A 4 hour adsorption period followed at a flow of 70 scfm, pressure of 81 psig, and inlet temperature of 107°–104° F. The dewpoint at each hour of the adsorption period was as follows: −41° F., −37° F., −27° F., −15° F. The low pressure product purge represented 1.4% of the product flow.

EXAMPLE 5

A regeneration using the present invention heat of compression and pressure swing method was run. The heat of compression regeneration phase lasted 90 minutes. The inlet temperature was 302.5° F. and dewpoint at ambient pressure was 76.8° F. After a five-minute idle period, the low pressure product gas purge was started and run for 150 minutes at a flow of 5 scfm and temperature of 112° F. After another 10-minute idle period, a 4 hour adsorption run at a flow of 70 scfm, with pressure at 80 psig, and an inlet temperature of 102.5° F. The dewpoints taken after each hour during the adsorption was as follows: −45.7° F., −41.9° F., −41.2° F., −29.4° F. The low pressure product purge represented 4.4% of the product flow.

EXAMPLE 6

A regeneration using the present invention heat of compression method and pressure swing method was run. The heat of compression phase lasted 95 minutes. The flow rate was 75 scfm, with pressure at 80 psig. The inlet temperature was 294° F. with dewpoint being 76.5° F. at ambient pressure. The low pressure product gas purge was then started and run for 160 minutes, at a flow rate of 1.1 SCFM and with inlet temperatures ranging from 108° F. to 102° F. After a five-minute idle period, the four hour adsorption run was started. The dewpoint taken each hour during the adsorption was as follows: −35° F., −26° F., −14.5° F., −5° F. The low pressure product purge represented 1% of the product flow.

Figure 2:
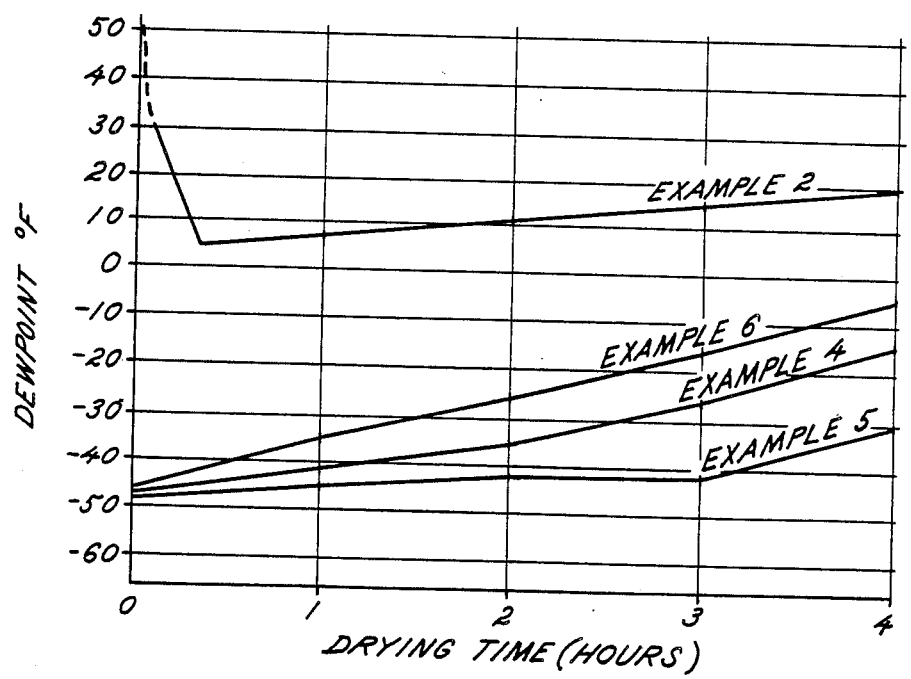
FIG. 2 is a graphic illustration of the dewpoint capability of the current art heat of compression regeneration system versus the present invention heat of compression/pressure swing regeneration system.

The dewpoint performance obtained with Examples 2, 4, 5 and 6 are graphically illustrated in FIG. 2, wherein the x axis depicts drying time in hours and the y axis depicts dewpoint in degrees Fahrenheit. Of particular interest is the dewpoint spike in example 2 lasting approximately 30 minutes into the adsorption period. As discussed above, a drawback of the conventional heat of compression regeneration system is that they exhibit initial decreased dewpoint capability due to the latent heat carried over from regeneration. It will be noted that this dewpoint spike is absent in the present invention as depicted in Examples 4, 5 and 6.

The present invention offers significant savings in regeneration energy when compared to the three types of regeneration systems described above and summarized in tabular form in Table I above. Data for the same dryer described above operating according to the present invention is set out in Table II below.

TABLE II

| Feed Air Conditions | % Purge | Dewpoint | Energy Requirement |
|---|---|---|---|
| 100° F., 50% RH | 4.4% | −40° F. | 13.2KW |
| 60° F., 50% RH | 1.0% | −40° F. | 3KW |
| 100° F., 50% RH | 1.0% | −5° F. | 3KW |

Comparison of the data in Table I with that in Table I shows that the regeneration energy requirement for the present invention at summer and winter conditions is only 14.2% and 9.7% respectively, of the comparable requirements for conventional heat of compression dryers. This significant energy reduction, coupled with avoidance of dewpoint spikes and lower temperature swings in the desiccant render regeneration according to the present invention highly desirable compared to prior art techniques.

The invention, while offering a low energy method of drying gas to low dewpoints without the need for a booster heater, may also be practiced with a booster heater (shown in phantom as item 30 in FIG. 1) to accomplish even lower dewpoint production. It is contemplated that employment of booster heater employed with a combination heat of compression/pressure swing regeneration according to the invention would enhance the ability to provide dewpoint depression with lower energy requirements than for known regeneration systems.

We claim as our invention:

1. A method of regenerating a bed of adsorbent material having water adsorbed thereon to a desired moisture content comprising:
   a first pressurized regeneration phase using heat present in the heated feed gas from the discharge of a feed gas compressor to desorb a portion of the moisture from the regenerating desiccant chamber, the temperature of the feed gas being maintained at less than that necessary to regenerate the adsorbent to the desired moisture content and a second regeneration phase utilizing a portion of a product gas as a low-pressure purge gas to desorb additional moisture from said desiccant, the low pressure regeneration being continued until a sufficient volume of product gas has passed through the bed to reduce the moisture content of the bed to the desired moisture content.

2. The method according to claim 1 wherein the regeneration further employs an idle period following the low pressure purge prior to returning the adsorbent bed to an adsorbtion cycle.

3. The method according to claim 1 wherein the dry purge gas employed for the second phase of the regeneration is product gas from a second adsorption bed.

4. The method of claim 1 wherein the volume of purge gas used in the second regeneration phase is about 1% to about 5% of the total product gas.

5. The method of claim 1 wherein the temperature of the feed gas is about 300° F. or less.

* * * * *